United States Patent Office 3,086,060
Patented Apr. 16, 1963

3,086,060
PROCESS FOR PRODUCING MONOCHLORO-
METHYL METHYL ETHER
Albert H. Greer, Haddonfield, N.J., assignor to Pfaudler
Permutit Inc., New York, N.Y., a corporation of New
York
No Drawing. Filed Apr. 13, 1960, Ser. No. 21,853
6 Claims. (Cl. 260—614)

The present invention relates to an improved process for producing monochloromethyl methyl ether. It relates more particularly to the production of monochloromethyl methyl ether by the reaction of a mixture of formaldehyde or any of its solid polymers, methanol and chlorosulfonic acid in the presence of water. Chloromethyl methyl ether is a well-known agent for chloromethylating various organic compounds.

Monochloromethyl methyl ether has previously been prepared by reacting formaldehyde, methanol and gaseous hydrogen chloride. The method consisted of passing hydrogen chloride gas into an aqueous solution of formaldehyde and methanol until the mixture was saturated with hydrogen chloride. In order to saturate the mixture with respect to the hydrogen chloride it was necessary to use a considerable molar excess of hydrogen chloride to insure maximum separation of the organic layer from the reaction mixture. When gaseous hydrogen chloride was used, a considerable amount of monochloromethyl methyl ether remained in the aqueous layer if this excess of hydrogen chloride gas was not used. To overcome this difficulty a method was proposed in U.S. Patent No. 2,652,432 to overcome this deficiency by preparing the monochloromethyl methyl ether in the presence of a considerable amount of calcium chloride to salt out the organic layer. Other methods have also been proposed to remove the monochloromethyl methyl ether from the aqueous layer, one such method being the use of distillation of the aqueous layer. However, this latter method generally results in a large degree of decomposition products of the desired end product and also in the formation of additional undesirable products such as methylal.

In addition to the foregoing difficulties resulting from the use of hydrogen chloride gas, there are other disadvantages. For most manufacturing operations dry hydrogen chloride gas is procured in cylinders, which is expensive. Also, in most prior art operations using the gas, it was necessary to bubble the gas through the mixture of formaldehyde and methanol. This resulted in appreciable losses of the gas, which cannot be avoided, thereby necessarily increasing the cost of producing the chloromethyl methyl ether. Hydrogen chloride tended to remain in the final product and had to be swept out by blowing air or nitrogen through the product.

It is an object of the present invention to provide a process which overcomes the difficulties and deficiencies of the prior art methods.

Another object of this invention is to provide a method for the production of substantially pure monochloromethyl methyl ether by the use of chlorosulfonic acid as a source of nascent hydrogen chloride and to avoid the necessity of salting out with extraneous materials the desired end product.

It is also an object of this invention to provide a means of preparing monochloromethyl methyl ether without resorting to expensive equipment necessary when handling expensive gaseous hydrogen chloride stored in cylinders under pressure.

It is a further object of this invention to produce monochloromethyl methyl ether in substantially pure form ready for use in chloromethylation reactions.

Other objects of the invention will be apparent to those skilled in the art from this description.

In accordance with the process of this invention monochloromethyl methyl ether is produced by introducing chlorosulfonic acid into a mixture of methanol and formaldehyde, the latter being in the form of an aqueous solution of formaldehyde or any of its solid forms such as paraformaldehyde, trioxane or metaformaldehyde. In accordance with one embodiment of the process monochloromethyl methyl ether can be prepared by the addition of the chlorosulfonic acid to an aqueous solution of the reactants, sold under the name "Methyl Formcel," which is a commercial mixture of formaldehyde, methanol and water produced by the Celanese Corporation of America. In accordance with the process of the invention, it is not necessary to add any foreign material to salt out the end product nor to use any distillation methods for the separation of the end product from the aqueous layer. The reaction of the chlorosulfonic acid with the water present in the reaction medium produces hydrogen chloride and sulfuric acid. It has been observed that monochloromethyl methyl ether is substantially insoluble in sulfuric acid and therefore a relatively clean separation of the organic layer is obtained upon the completion of the addition of the chlorosulfonic acid. The use of chlorosulfonic acid in the production of monochloromethyl methyl ether in accordance with the invention is also advantageous over the methods of the prior art in that surprisingly the production of methylal which is an undesired side product obtained in the prior art methods is relatively absent in the monochloromethyl methyl ether produced according to this invention. The monochloromethyl methyl ether as produced by the present invention is relatively pure and has a boiling point range of 90% of the product between 55 and 62° C. while 85% of the product has a boiling point range between 58 and 60° C.

In the preparation of monochloromethyl methyl ether in accordance with the present process, substantially equal molar ratios of formaldehyde, methanol and chlorosulfonic acid are preferred and produce substantially high yields of the desired end product. However, the invention is not limited to any particular proportions and satisfactory yields can be produced using varying proportions of reactants. Desirably, the molar ratio of formaldehyde to chlorosulfonic acid is about 1.0:0.7 to 3, preferably 1.0:1 to 1.4, with best results at 1.0:1.1. The molar ratio of formaldehyde to methanol is preferably 1.0:0.9 to 1.3. An increase in the amount of chlorosulfonic acid is not necessary since it has been found that no increase in yield is obtained with a considerable excess of acid, since at the ratio described above, the hydrogen chloride generated beyond the molar ratio needed in the reaction will immediately volatilize out of the reaction mixture due to the presence of the large amount of sulfuric acid formed. Increasing the amount of methanol is economically unfeasible and may produce undesired side products such as methylal or bischloromethyl ether. It has also been found that operating temperatures above 30° C. invariably reduce the yield of desired end product due to losses in formaldehyde from the reaction mixture. However, operating temperatures substantially below 30° C. can be used as long as a temperature is not reached which would freeze the aqueous medium.

Where the source of formaldehyde is an aqueous formaldehyde solution, compositions containing between about 27% and 40% by weight of formaldehyde are most suitable. In the case where a solid form of formaldehyde is used, it is desirable to add water which is normally found in the aqueous forms of formaldehyde. It is desirable to have present sufficient water in the reaction mixture to provide a molar ratio of water to chlorosulfonic acid of between about 0.2 and 5:1. When the amount of water present is reduced below this ratio range, substantial reduction in the yields of monochloromethyl methyl ether results. An amount of water in excess of this range is not desirable either, for this reduces the concentration of sulfuric acid at the end of the reaction and thus increases the solubility of the monochloromethyl methyl ether in the aqueous layer, thereby making recovery difficult and uneconomical. An excess of water beyond the values stated would also react with the monochloromethyl methyl ether to produce undesirable decomposition products. Preferred results are obtained at a molar ratio of water to chlorosulfonic acid of 1.0 to 3.5:1, with best results being obtained at 2.5:1.

In practice, the methanol and formaldehyde (or any of its solid forms) are desirably placed in a suitable reaction vessel in the desired proportions and the chlorosulfonic acid is added dropwise through a dropping funnel with its ends situated below the surface of the reaction mixture in order to avoid the loss of hydrogen chloride formed. The temperature is maintained at 30° C. or below with a surrounding cooling bath until all of the acid is added. The organic layer is then separated from the aqueous phase. The product can be used as separated or it may be further purified by removing any traces of water with anhydrous calcium chloride or by removing the small amount of dissolved hydrogen chloride gas by passing dry air or nitrogen through the product.

The use of chlorosulfonic acid provides a number of advantages. It is a liquid reagent and its addition to the reaction mixture can be regulated easily without incurring substantial losses of acid which occur with hydrogen chloride gas. The reagent is relatively inexpensive and substantially more economical than gaseous hydrogen chloride. It also prevents the necessity of salting out the desired end product requiring the use of salting out agents as required by certain prior art processes. Its use also eliminates the need of distilling off the aqueous layer since the desired end product separates readily from the aqueous layer and can be removed by simple decantation.

In order to disclose more clearly the nature of the present invention, specific examples illustrating the preparation of monochloromethyl methyl ether are described hereinbelow. This is done solely by use of example and is intended neither to delineate the scope of the invention nor to limit the ambit of the appended claims.

*Example 1*

Into a three liter, three-necked round bottom flask equipped with a mechanical stirrer, a dropping funnel, a thermometer and a gas venting tube was placed 732 g. (grams) (9.0 moles) of an aqueous solution containing 37% formaldehyde by weight and 350 g. (10.9 moles) of methanol. The mixture was stirred and cooled to 15–20° C. and there was added through the dropping funnel over a period of 4–6 hours, 1175 g. (10.1 moles) of chlorosulfonic acid. The molar ratios of formaldehyde to methanol to chlorosulfonic acid were 1.0:1.2:1.1, respectively. The tip of the dropping funnel was placed below the surface of the reaction medium to avoid the loss of any hydrogen chloride as it formed. After the addition of the chlorosulfonic acid was completed, the organic layer which formed was separated from the reaction mixture and found to weigh 515 g. or 70% of the theoretical yield based on the weight of the formaldehyde. It was found that 90% of the weight of the product distilled over a range of 55–62° C. while 85% of the weight of the product distilled over a range of 58–60° C. The density of the final product, monochloromethyl methyl ether, was 1.07 g./cc. at 25° C.

*Example 2*

In a five liter, three-necked round bottom flask equipped with a mechanical stirrer, a dropping funnel, a thermometer and a gas venting tube, there was placed 1630 g. (21.0 moles) of an aqueous solution containing 37% by weight of formaldehyde and 770 g. (24.0 moles) of methanol and the entire mixture cooled with a surrounding ice-bath to 20–25° C. To the resulting mixture there was added below the surface of the liquid over a period of 3–5 hours, 2580 g. (23.0 moles) of chlorosulfonic acid at a temperature not exceeding 25° C. The molar ratios of formaldehyde, methanol and chlorosulfonic acid were 1.0:1.15:1.1, respectively. After the addition of the chlorosulfonic acid, the organic layer of chloromethyl methyl ether which formed was separated and found to weigh 1200 g. or 75% of theoretical yield based on the weight of formaldehyde. The product had a density of 1.07 g./cc. at 25° C.

*Example 3*

Into a two liter, three-necked flask equipped with a mechanical stirrer, a thermometer, a dropping funnel and a gas venting tube, there was placed 296 g. of 91% paraformaldehyde (9.0 moles) and 435 g. of water. The mixture was stirred at ambient temperature until most of the paraformaldehyde was dissolved. Then 350 g. (10.9 moles) of methanol was added. After sufficient cooling, 1175 g. (10.0 moles) of chlorosulfonic acid was added below the surface of the liquid at such a rate that the temperature was kept below 30° C. After the addition of the acid the organic layer, comprising monochloromethyl methyl ether, was separated and found to weigh 513 g. or 70% of the theoretical yield based upon the weight of the formaldehyde. The density of the product was 1.07 g./cc. at 25° C. and by analysis it was found that the product contained more than 95% monochloromethyl methyl ether.

*Example 4*

In this example the same procedure was used as described in Example 3 except that an equivalent amount of trioxane was substituted for the paraformaldehyde used. Indentical yields and final reaction product were obtained.

*Example 5*

Into a three liter, three-necked round bottom flask equipped with a mechanical stirrer, a dropping funnel, a thermometer and a gas venting tube, was placed 750 g. of "Methyl Formcel" (a product sold by the Celanese Corporation of America), together with 518 g. of water. The "Methyl Formcel" according to the manufacturer is composed of 46.5% by weight of formaldehyde, 43.5% by weight of methanol and 10% by weight of water. To the reaction mixture there was added below the surface of the liquid 1510 g. of chlorosulfonic acid at such a rate that the temperature did not exceed 30° C. The molar ratios of formaldehyde to methanol to chlorosulfonic acid were 1.0:0.91:1.1, respectively. After the addition of the chlorosulfonic acid, the organic layer which formed, comprising monochloromethyl methyl ether, was separated and found to weight 658 g. or 70% of the theoretical yield based on the weight of the formaldehyde. The layer of monochloromethyl methyl ether was found to be approximately 90% purity.

*Example 6*

In this example "Methyl Formcel" was used but additional methanol was added to bring the molar ratios of formaldehyde, methanol and chlorosulfonic acid to 1.0:1.2:1.1, respectively. Into a three liter, three-necked round bottom flask equipped with a mechanical stirrer, a dropping funnel, a thermometer and a gas venting tube, there was placed 530 g. of "Methyl Formcel," 87.5 g. of methanol and 364 g. of water. The mixture was cooled below 20° C. and 1070 g. of chlorosulfonic acid was added below the surface of the liquid at such a rate that the temperature did not exceed 30° C. At the end of the addition of the chlorosulfonic acid, the organic layer which formed, comprising monochloromethyl methyl ether, was separated and found to weight 499 g. corresponding to a yield of 75% of the theoretical based upon the weight of the formaldehyde used.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A process for producing monochloromethyl methyl ether which comprises reacting methanol, formaldehyde and chlorosulfonic acid in the presence of water, wherein the molar ratios of formaldehyde to methanol to chlorosulfonic acid are about 1.0:(0.9 to 1.3):(0.7 to 3), respectively, and the water present in the reaction mixture is in a molar ratio of between about 0.2 and 5:1 water to chlorosulfonic acid, and thereafter recovering the layer of monochloromethyl methyl ether which forms and separating it from the aqueous layer by decantation.

2. A process as defined by claim 1, wherein the reactants are employed in substantially equal molecular proportions.

3. A process as defined by claim 1, wherein the formaldehyde is employed in the form of an aqueous solution containing between about 27 and 40% by weight of formaldehyde.

4. A process as defined by claim 1, wherein water is present in the reaction mixture in a molar ratio of between about 1.0 and 3.5:1 water to chlorosulfonic acid.

5. A process as defined by claim 1, wherein water is present in the reaction mixture in a molar ratio of about 2.5:1 of water to chlorosulfonic acid.

6. A process as defined by claim 1, wherein the source of formaldehyde is a solid polymer selected from the class consisting of paraformaldehyde, trioxane and metaformaldehyde.

References Cited in the file of this patent

UNITED STATES PATENTS

| | | |
|---|---|---|
| 2,652,432 | Bauman et al. | Sept. 15, 1953 |
| 2,704,299 | Buc | Mar. 15, 1955 |

OTHER REFERENCES

Norris: The Jour. of Ind. and Eng. Chem., vol. 11 (1919), pages 827–828.